United States Patent
Mitlin et al.

(10) Patent No.: US 8,297,935 B2
(45) Date of Patent: Oct. 30, 2012

(54) TURBINE BLADES AND METHODS OF FORMING MODIFIED TURBINE BLADES AND TURBINE ROTORS

(75) Inventors: Bob Mitlin, Scottsdale, AZ (US); Mark C. Morris, Phoenix, AZ (US); Steve Halfmann, Chandler, AZ (US); Ardeshir Riahi, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1016 days.

(21) Appl. No.: 12/273,108

(22) Filed: Nov. 18, 2008

(65) Prior Publication Data

US 2010/0284819 A1 Nov. 11, 2010

(51) Int. Cl.
*F01D 5/14* (2006.01)

(52) U.S. Cl. .............. 416/243; 416/226; 416/223 R; 416/97 R; 416/219 R; 29/889.7; 29/407.01

(58) Field of Classification Search ............. 416/243, 416/226, 223 R, 97 R, 219 R; 29/889.7; 29/407.01
See application file for complete search history.

(56) References Cited

U.S. PATENT DOCUMENTS

| | | |
|---|---|---|
| 3,771,922 A | 11/1973 | Tracy |
| 4,083,655 A | 4/1978 | Tempere |
| 4,797,066 A | 1/1989 | Stromberg |
| 4,802,823 A | 2/1989 | Decko et al. |
| 5,108,262 A | 4/1992 | Crane |
| 5,340,280 A | 8/1994 | Schilling |
| 5,947,687 A | 9/1999 | Mori et al. |
| 6,181,978 B1 | 1/2001 | Hinds et al. |
| 6,190,128 B1 | 2/2001 | Fukuno et al. |
| 6,290,465 B1 | 9/2001 | Lammas et al. |
| 6,944,580 B1 | 9/2005 | Blume et al. |
| 7,047,167 B2 | 5/2006 | Yamaguchi et al. |
| 7,219,043 B2 | 5/2007 | Rebello et al. |
| 2001/0016163 A1 | 8/2001 | Tomita et al. |
| 2003/0136001 A1 | 7/2003 | Nishiyama et al. |
| 2005/0111978 A1 | 5/2005 | Strohl et al. |
| 2006/0147311 A1 | 7/2006 | Broderick et al. |
| 2008/0101959 A1 | 5/2008 | McRae et al. |

*Primary Examiner* — Junghwa M Im
(74) *Attorney, Agent, or Firm* — Ingrassia Fisher & Lorenz, P.C.

(57) ABSTRACT

Turbine blades and methods of forming modified turbine blades and turbine rotors for use in an engine are provided. In an embodiment, by way of example only, a turbine blade includes a platform and an airfoil. The platform includes a surface configured to define a portion of a flowpath, and the surface includes an initial contour configured to plastically deform into an intended final contour after an initial exposure of the blade to an operation of the engine. The airfoil extends from the platform.

14 Claims, 4 Drawing Sheets

TURBINE BLADES AND METHODS OF FORMING MODIFIED TURBINE BLADES AND TURBINE ROTORS

STATEMENT REGARDING FEDERALLY SPONSORED RESEARCH OR DEVELOPMENT

This invention was made with Government support under W911W6-08-2-0001 awarded by the U.S. Army. The Government has certain rights in this invention.

TECHNICAL FIELD

The inventive subject matter generally relates to turbines, and more particularly relates to turbine blades and methods of forming turbine blades and turbine rotors for use in turbines.

BACKGROUND

Gas turbine engines, such as turbofan gas turbine engines, may be used to power various types of vehicles and systems, such as aircraft. Typically, these engines include turbines that rotate at a high speed when blades (or airfoils) extending therefrom are impinged by high-energy compressed air. Consequently, the blades are subjected to high heat and stress loadings which, over time, may reduce their structural integrity.

To maintain blade structural integrity, a blade cooling scheme is typically incorporated into the turbines. The blade cooling scheme is included to maintain the blade temperatures within acceptable limits. In some cases, the blade cooling scheme directs cooling air through an internal cooling circuit formed in the blade. The internal cooling circuit consists of a series of connected, serpentine cooling passages, which incorporate raised or depressed structures therein. The serpentine cooling passages increase the cooling effectiveness by extending the length of the air flow path. In this regard, the blade may have multiple internal walls that form intricate passages through which the cooling air flows to feed the serpentine cooling passages. The blade cooling scheme may also include platform cooling, in some cases. For example, openings may be formed through a turbine disk from which the blades radiate, and the openings may direct cool air from a cool air source onto a platform of the blade.

As the desire for increased engine efficiency continues to rise, engine components are increasingly being subjected to higher and higher operating temperatures. However, current engine components, such as blades and blade platforms, may not be adequately designed to withstand such temperatures over time. In particular, current blade and blade platforms may be prone to thermo-mechanical fatigue, plastic deformation, and/or platform shingling, when exposed to the newer engine design operating temperatures.

Accordingly, it is desirable to have an improved blade that may operate with improved durability when exposed to high engine operating temperatures. In addition, it is desirable to have an improved blade that is relatively simple and inexpensive to implement and that may be retrofitted into existing engines. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Turbine blades and methods of forming modified turbine blades and turbine rotors for use in an engine are provided.

In an embodiment, by way of example only, a turbine blade includes a platform and an airfoil. The platform includes a surface configured to define a portion of a flowpath, and the surface includes an initial contour configured to plastically deform into an intended final contour after an initial exposure of the blade to an operation of the engine. The airfoil extends from the platform.

In another embodiment, by way of example only, a method of forming a modified turbine blade includes providing an unmodified blade configuration including a platform and an airfoil extending from the platform, the platform including a surface defining a portion of a flowpath of the engine, and subjecting the unmodified blade configuration to one or more maximum engine operating conditions, wherein the one or more maximum engine operating conditions include rotating a turbine rotor including the unmodified blade configuration thereon at a predetermined maximum speed and exposing the turbine rotor to a predetermined maximum temperature. The method also may include performing a plastic analysis of the unmodified blade configuration, while the unmodified blade configuration is subjected to the one or more maximum engine operating conditions, calculating a residual plastic deformation of the platform surface, based on the plastic analysis, determining whether the residual plastic deformation of the platform surface is within a predetermined acceptable range, determining an inverse of the residual plastic deformation of the platform surface, if a determination is made that the residual plastic deformation of the platform surface is within the predetermined acceptable range, and incorporating the inverse of the residual plastic deformation of the platform surface into the unmodified blade configuration to form the modified blade configuration.

In still another embodiment, by way of example only, a method of forming a turbine rotor includes providing an unmodified blade configuration including a platform and an airfoil extending from the platform, the platform including a surface defining a portion of a flowpath of the engine. The unmodified blade configuration is subjected to one or more maximum engine operating conditions, wherein the one or more maximum engine operating conditions include rotating a turbine rotor including the unmodified blade configuration thereon at a predetermined maximum speed and exposing the turbine rotor to a predetermined maximum temperature. A plastic analysis of the unmodified blade configuration is performed, while the unmodified blade configuration is subjected to the one or more maximum engine operating conditions. A residual plastic deformation of the platform surface is calculated, based on the plastic analysis. A determination is made as to whether the residual plastic deformation of the platform surface is within a predetermined acceptable range. An inverse of the residual plastic deformation of the platform surface is determined, if a determination is made that the residual plastic deformation of the platform surface is within the predetermined acceptable range. The inverse of the residual plastic deformation of the platform surface is incorporated into the unmodified blade configuration to form the modified blade configuration. A turbine blade is cast from a mold including the modified blade configuration. The turbine blade is attached to a hub to form the turbine rotor. The turbine rotor is then rotated at the maximum engine operating conditions to impart a final contour to the turbine blade.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
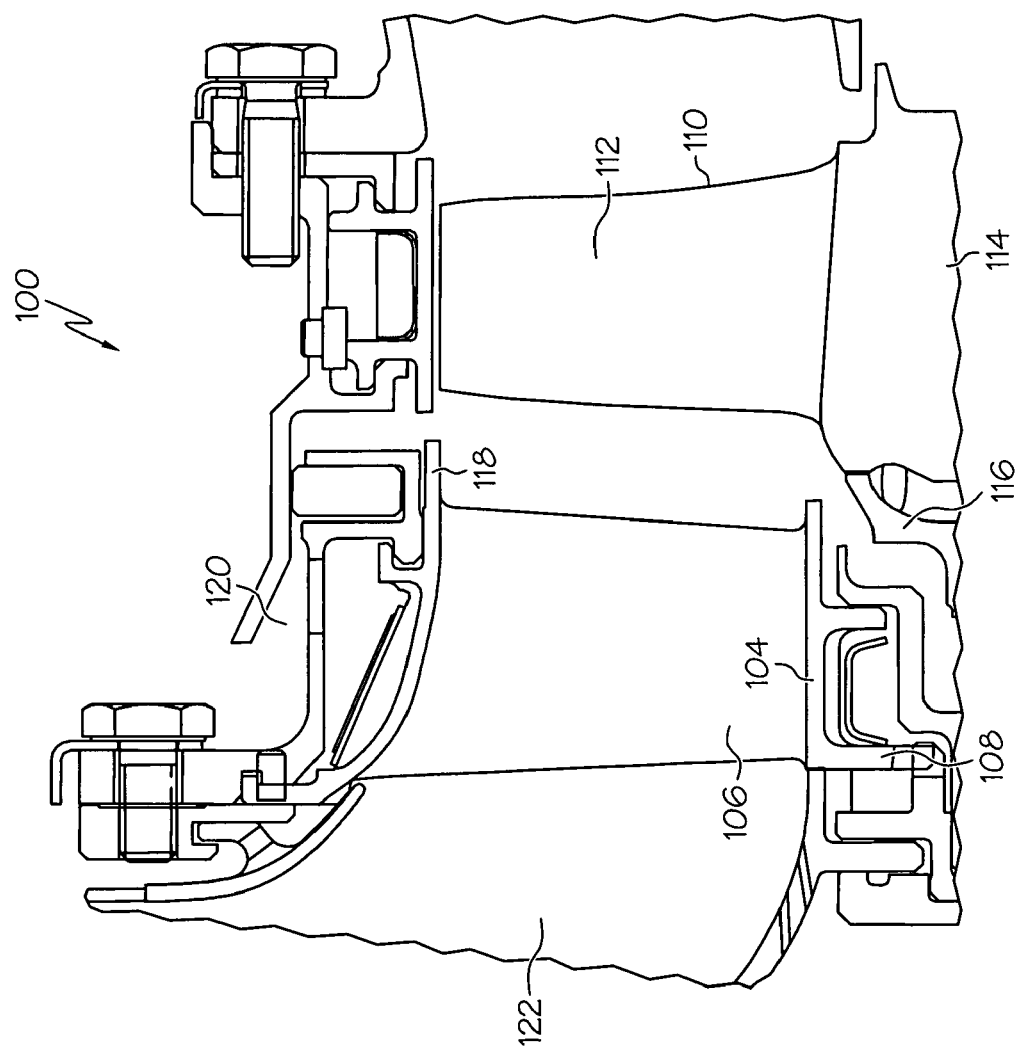
FIG. 1 is a cross-sectional side view of a turbine section of an engine, according to an embodiment.

FIG. 1 is a cross-sectional side view of a portion of a turbine section 100 of an engine, according to an embodiment. The turbine section 100 receives high temperature (e.g, temperature greater than 1100° C.) gases from an upstream engine combustor (not shown) to produce energy for the engine and/or components coupled to the engine. In an embodiment, the turbine section 100 includes a turbine nozzle 104 that has a plurality of static vanes 106 mounted circumferentially around a ring 108. The static vanes 106 direct the gases from the combustor to a turbine rotor 110. According to an embodiment, the turbine rotor 110 includes a plurality of blades 112 (only one of which is shown) that are attached to a hub 114 and retained in axial position by a retention plate 116. When the blades 112 are impinged upon by the gases, the gases cause the turbine rotor 110 to spin. According to an embodiment, an outer circumferential wall 118 surrounds the static vanes 106 and the plurality of blades 112 to define a flowpath 122. The circumferential wall 118 also defines a portion of a compressor plenum 120 that is disposed radially outwardly relative to the flowpath 122. The compressor plenum 120 receives bleed air from a compressor section (not shown), which may be directed through one or more openings in the outer circumferential wall 118 towards the plurality of blades 112 to cool the blades 112.

Figure 2:
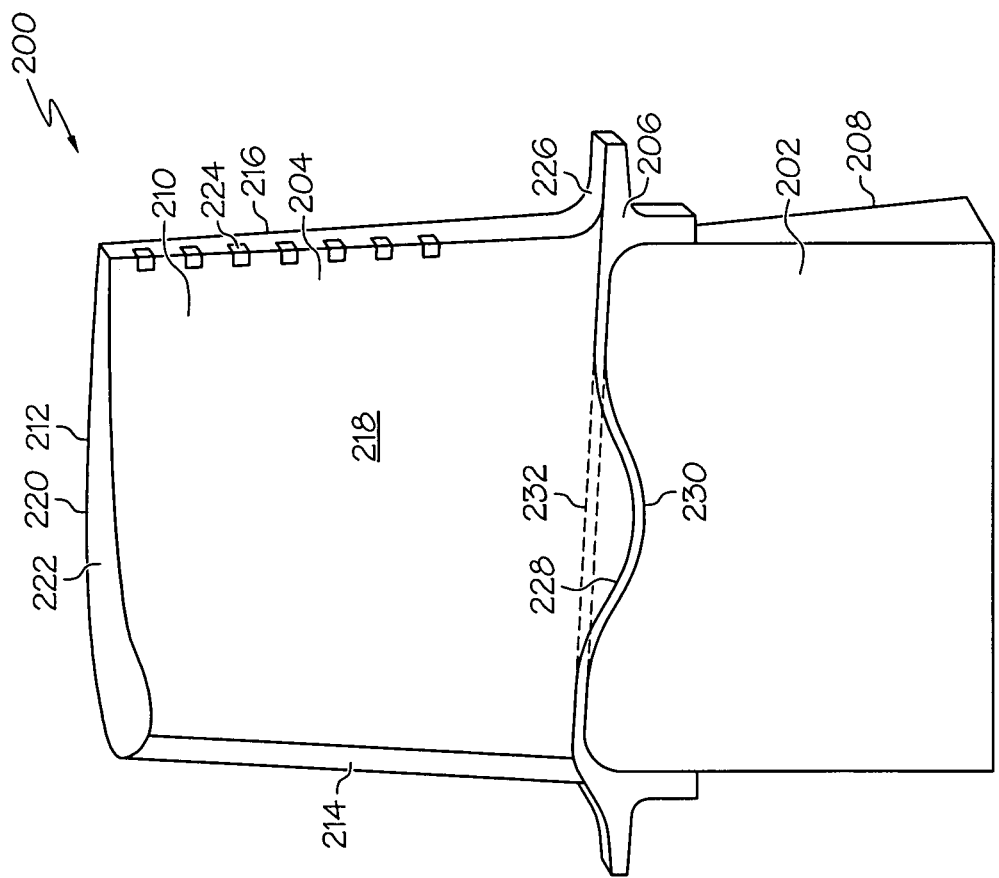
FIG. 2 is a perspective view of a turbine blade, according to an embodiment.

FIG. 2 is a perspective view of a blade 200, according to an embodiment. The blade 200 is configured to transform from a first, initial shape to a second, permanent shape, where the first, initial shape includes a contour imparted to the blade 200 during manufacture and the second, permanent shape includes a contour imparted to the blade 200 as a result of being subjected to maximum engine operating conditions. In an embodiment, the maximum engine operating conditions may include maximum conditions at which an engine may be designed to operate. For example, a maximum condition may include a predetermined maximum speed at which a turbine may be designed to rotate within the engine. In an embodiment, the predetermined maximum speed may be a rotational speed in a range of from about 10,000 rotations per minute (rpm) to about 50,000 rpm. In other embodiments, the predetermined maximum speed may be greater than or less than the aforementioned range. In another example, a maximum condition may include a predetermined maximum temperature to which the turbine is designed to be exposed. For example, the predetermined maximum temperature may be in a range of from about 1100° C. to about 1700° C. In other embodiments, the predetermined maximum temperature may be greater than or less than the aforementioned range. In still other embodiments, the maximum condition may include other parameters in accordance with which an engine is designed to operate.

In any case, the blade 200 may comprise a single crystal blade including a nickel-based superalloy, in an embodiment. Suitable nickel-based superalloys include, but are not limited to, CMSX3, or SC180. In other embodiments, the blade 200 may comprise a polycrystalline structure. Suitable materials include, but are not limited to, MAR-M-247EA or MAR-M-247DS.

The blade 200 includes a blade attachment section 202, an airfoil 204, and a platform 206. The blade attachment section 202 provides an area in which a shape 208 is machined. In an embodiment, the shape 208 corresponds with a shape formed in a respective blade attachment slot (not shown) of the turbine hub (e.g., hub 114 in FIG. 1). For example, in some embodiments, the shape 208 may be a firtree shape. In other embodiments, the shape 208 may be a beveled shape. However, in other embodiments, any one of numerous other shapes suitable for attaching the blade 200 to the turbine may be alternatively machined therein.

The airfoil 204 has two outer walls 210, 212, each having outer surfaces that define an airfoil shape. The airfoil shape includes a leading edge 214, a trailing edge 216, a pressure side 218 along the first outer wall 210, a suction side 220 along the second outer wall 212, a blade tip 222, a pressure side discharge trailing edge slot 224, and an airfoil platform fillet 226. Though not shown, the blade 200 may have an internal cooling circuit formed therein, which may extend from an opening in the platform 206 through the blade 200 and may include various passages that eventually communicate with the trailing edge slot 224 or other openings (not shown) that may be formed in the blade 200.

The platform 206 has a surface 228 that is adapted to define a portion of a flowpath that extends through the engine (e.g., flowpath 122 of FIG. 1). In an embodiment, the surface 228 may be adapted to include the first, initial shape imparted thereto during manufacture of the blade 200, and to transform to the second, permanent shape after being subjected to the maximum engine operating conditions. According to an embodiment, the first initial shape of the surface 228 may include a specially-designed depression 230. The depression 230 may be located adjacent to the concave, pressure side wall 210, in an embodiment. In another embodiment, the depression 230 may be located adjacent to the convex, suction side wall 212. Although the depression 230 is shown in FIG. 2 as having a particular shape, the depression 230 may have a different shape, in other embodiments. For example, though the depression 230 is defined by a generally smooth surface in FIG. 2, the surface may include protrusions, bumps, or other features in other embodiments. In any case, after the blade 200 is exposed to the maximum engine operating conditions, the depression 230 transforms into an intended shape 232 (shown in phantom), which provides the platform 206 with a desired final contour for defining a portion of the flowpath (e.g., flowpath 122 in FIG. 1), when the blade 200 is attached to a turbine that is disposed in a turbine engine.

Figure 3:
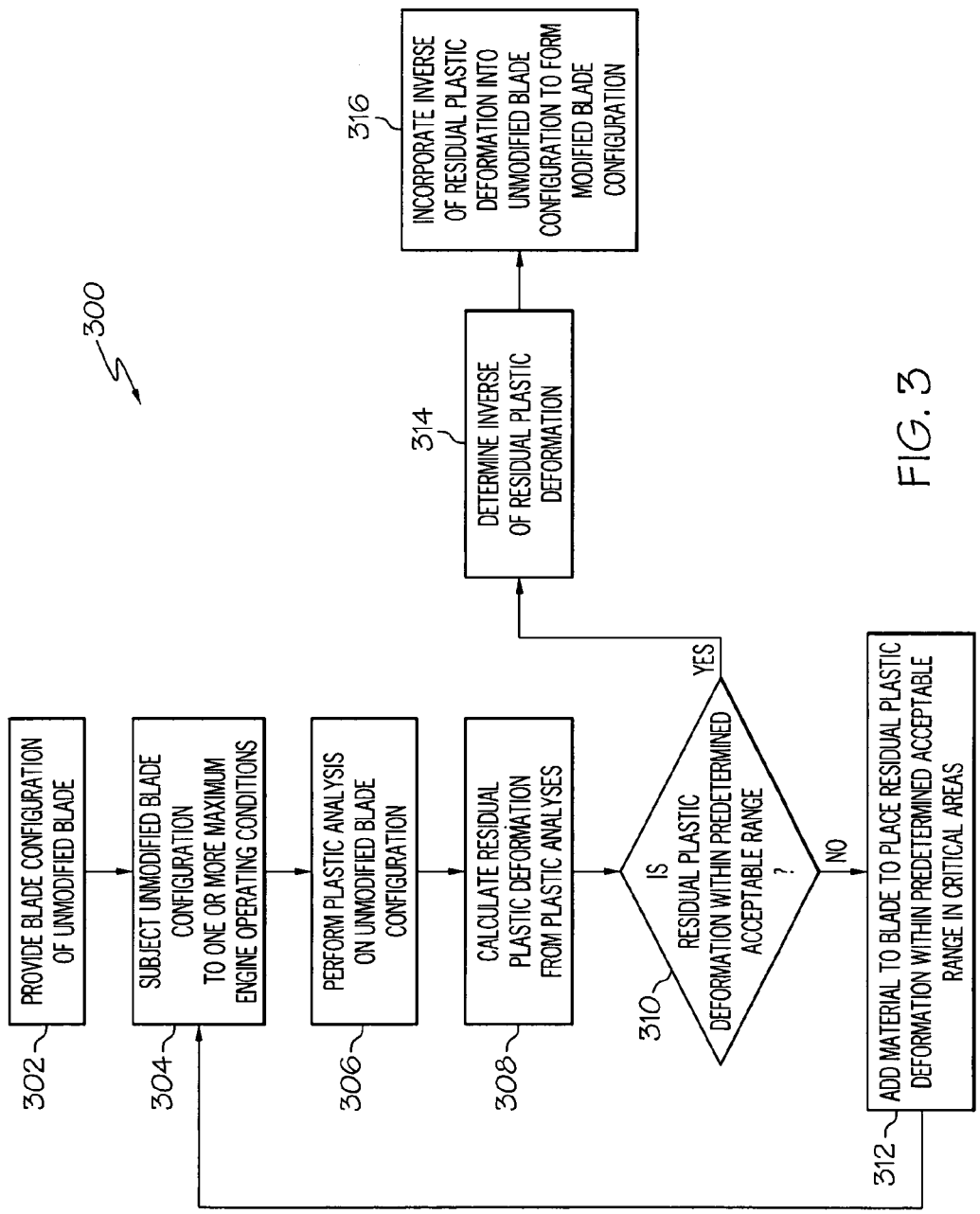
FIG. 3 is a flow diagram of a method of forming a turbine blade, according to an embodiment.

To manufacture the blade 200 described above, method 300 may be employed. FIG. 3 is a flow diagram of method 300 of forming a turbine blade, according to an embodiment. As used herein, a blade (such as blade 200 in FIG. 2) including an intentionally incorporated depression (such as specially-designed depression 230 in FIG. 2) may be referred to hereinafter as a "modified blade". A blade that does not have and has never included an intentionally incorporated depression may be referred to hereinafter as an "unmodified blade".

Method 300 includes providing a blade configuration of an unmodified blade, step 302. In an embodiment, the unmodified blade configuration includes a platform and an airfoil extending from the platform, where the platform includes a surface defining a portion of a flowpath of the engine. According to another embodiment, the unmodified blade configuration includes other features of a blade, such as a blade attachment section, suction side walls, pressure side walls, and the like, which may have particular shapes. In any case, the unmodified blade configuration may be provided as a computer-generated (e.g., virtual) model or as an actual blade.

In accordance with an embodiment, the unmodified blade configuration is subjected to one or more maximum engine operating conditions, step 304. The maximum engine operating conditions may include operating conditions described above in conjunction with the blade 200. The unmodified blade configuration, which may be provided as a virtual or an actual blade, may be virtually subjected to the maximum engine operating conditions, in an embodiment. For example, the maximum engine operating conditions may be provided as computer-generated data which is used during the simulated operation of a computer-generated model of the unmodified turbine blade configuration. In accordance with another embodiment in which the unmodified blade configuration is implemented as an actual blade, the actual blade is disposed on a turbine rotor, and an engine within which the turbine rotor is disposed is powered on to simulate the maximum engine operating conditions.

Next, a plastic analysis of the unmodified blade configuration is performed, while the unmodified blade configuration is subjected to the maximum engine operating conditions, step 306. According to an embodiment, the plastic analysis includes determining a flow structure of the flowpath defined by the platform surface (e.g., surface 228 in FIG. 2) of the unmodified blade configuration, while the unmodified blade configuration is subjected to the maximum engine operating conditions. For example, the flow structure of the flowpath may be determined by performing a computational fluid dynamics analysis, which may include performing calculations to identify algorithms that simulate an interaction of a gas flowing along the flowpath relative to platform surface. The analysis may be based purely on computer-generated data, or may be based at least partially on data that is collected from an actual blade operated in a controlled physical environment.

In another embodiment, the plastic analysis may additionally or alternatively include collecting temperature data across an area of the platform surface, while the unmodified blade configuration is subjected to the maximum engine operating conditions. In one example, a thermal analysis may be performed on the platform surface to determine platform temperature data. According to another embodiment, the temperature data may be obtained across an entirety of the platform surface. In other embodiments, the temperature data may be obtained across a portion of the platform surface. The temperature data may be physically collected by sensors that may be embedded on an actual blade, in an embodiment. In another embodiment in which simulated operation of a computer-generated turbine blade configuration is performed, the temperature data may be computer-generated, using data from the computational fluid dynamics analysis.

Residual plastic deformation of the platform is calculated from the plastic analysis, step 308. For example, analyses identifying stresses across the area of the platform surface may be performed in order to locate "critical areas" of residual plastic deformation. The "critical areas" may be locations on the platform at which the residual plastic deformation may fall outside of a predetermined acceptable range. The predetermined acceptable range may be a range that provides a maximum desired residual plastic deformation, when the unmodified blade configuration is subjected to the maximum engine operating conditions. It will be appreciated that the predetermined acceptable range of residual plastic deformation may depend on various factors, such as a particular desired design of a resultant blade, a particular design of engine components surrounding the resultant blade, engine operating parameters, and the like. A residual plastic deformation may be a permanent deformation in a material resulting from an application of stress to the material. In an embodiment, calculations are performed by identifying stresses and residual plastic deformation across the area of the platform surface to obtain identified critical areas. In accordance with an embodiment, calculations may be performed by identifying a maximum stress that a particular location of the platform surface can withstand without experiencing plastic deformation at the area. Calculations of the maximum stress may be obtained over an entirety of the platform surface, in an embodiment, or over a portion of the platform surface in another embodiment. The maximum stress calculations are used in conjunction with the temperature data collected and with data related to the strength of the particular material from which the blade may be comprised to determine a contour of the residual plastic deformation.

A determination is made as to whether the residual plastic deformation on the platform is within a predetermined acceptable range, step 310. In an embodiment, if a determination is made that the residual plastic deformation is not within the predetermined acceptable range, material may be added onto the blade to place the residual plastic deformation in the critical areas of the blade within the predetermined acceptable range, step 312. In one embodiment, the material may be substantially identical in formulation to the material of which the blade comprises. In another embodiment, the material may be different material. In still another embodiment, the material may be added to the blade in the form of a tapering of the platform surface or as an additional flange or rib that protrudes from the platform surface. In accordance with other embodiments, the material may be formed in another shape and added to the blade. When an actual blade is being operated in a controlled physical environment, the material may be added to the blade by a suitable conventional brazing or welding process. When simulated operation of a computer-generated turbine blade is performed, the material may be added by increasing the dimensions of the computer-generated turbine blade.

In accordance with an embodiment, to ensure that an appropriate amount of material has been added to the blade, steps 304, 306, 308, 310, and 312 may be repeated. If after step 310, a determination is made that the residual plastic deformation is within the predetermined acceptable range, an inverse of the residual plastic deformation is then determined, step 314. For example, the residual plastic deformation may be a protrusion and the inverse of the residual plastic deformation may be a depression that is sunken into an opposite side of the platform, where the depression may have a shape that is a mirror-image of the protrusion. To define the residual plastic deformation in mathematical terms, the contour of the residual plastic deformation (e.g., the protrusion) may be mapped as a plurality of data points, and an inverse of each data point is obtained to define the contour of the depression. In an embodiment, the inverse of the residual plastic deformation is then incorporated into the unmodified blade configuration to form the modified blade configuration, step 316.

Figure 4:
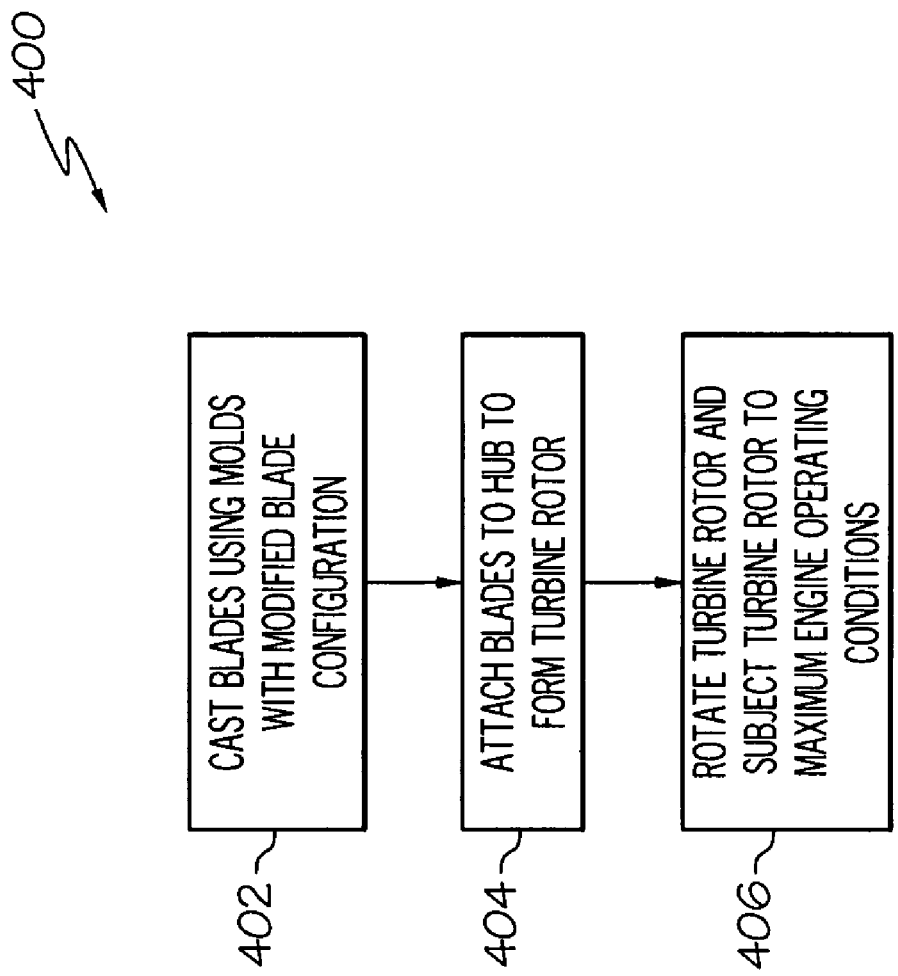
FIG. 4 is a flow diagram of a method of manufacturing a turbine rotor, according to an embodiment.

The modified blade configuration may be used to manufacture a turbine rotor, in an embodiment. FIG. 4 is a flow diagram of a method 400 of manufacturing a turbine rotor, according to an embodiment. In an embodiment, blades are cast using molds having the modified blade configuration, step 402. The blades are then attached to a hub to form a turbine rotor, step 404. In an embodiment, the blades and hub are cast using a conventional casting process. In an example, the blades and hub are cast together into an equiaxed nickel-based superalloy component. In another example, the blades may be cast from a nickel base superalloy, and the hub may be manufactured from a powder metal nickel superalloy. In any case, the hub and the blades may include substantially identical materials, in an embodiment. In other embodiments, the hub and the blades may be made of different materials. The number of blades included in the turbine rotor depends on a size of the hub and a number of blade attachment slots that may be formed in the hub. In one example, the hub may include thirty-eight blade attachment slots, and thirty-eight blades are included. In other embodiments, more or fewer slots and blades may be included. Still in other embodiments, the cast blades or blade ring may be metallurgically bonded to the hub to form the turbine rotor.

After the turbine rotor is manufactured, the turbine rotor is rotated and subjected to the maximum engine operating conditions, step 406. In an embodiment, the turbine rotor is incorporated into a turbine engine, and the turbine engine is operated at the maximum engine operation conditions. In another embodiment, the turbine rotor is disposed in an enclosure, maximum engine operation conditions including the predetermined maximum temperature, are simulated in the enclosure, and the turbine rotor is rotated at the predetermined maximum speed. In any case, as a result of the rotation and exposure to the maximum engine operating conditions, depressions in the platform surfaces of the blades may deform into the intended final contour so that the intended final contour is permanently imparted to the platform surface.

By forming the blades in the manner described above, the blades may be capable of operating at higher temperatures and at higher rotational speeds than conventional blades. In particular, the improved blades may operate with minimal incidence of undesired deformation, because including the specially-designed depression in the blade and subsequently exposing the blade to maximum engine operating conditions permanently plastically deforms the blade to the intended final contour. This permanent plastic deformation may impart favorable residual stresses in areas adjacent to the plastic deformation. Thus, when the blade is subjected to the maximum engine operating conditions again at a subsequent time, further plastic deformation may be minimized. The result is a blade which has improved durability and maintains performance in a high temperature and high speed environment over conventional blades.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method of forming a modified turbine blade for use in an engine, the method comprising the steps of:

providing an unmodified blade configuration including a platform and an airfoil extending from the platform, the platform including a surface defining a portion of a flowpath of the engine;

subjecting the unmodified blade configuration to one or more maximum engine operating conditions, wherein the one or more maximum engine operating conditions include rotating a turbine rotor including the unmodified blade configuration thereon at a predetermined maximum speed and exposing the turbine rotor to a predetermined maximum temperature;

performing a plastic analysis of the unmodified blade configuration, while the unmodified blade configuration is subjected to the one or more maximum engine operating conditions;

calculating a residual plastic deformation of the platform surface, based on the plastic analysis;

determining whether the residual plastic deformation of the platform surface is within a predetermined acceptable range;

determining an inverse of the residual plastic deformation of the platform surface, if a determination is made that the residual plastic deformation of the platform surface is within the predetermined acceptable range; and incorporating the inverse of the residual plastic deformation of the platform surface into the unmodified blade configuration to form the modified blade configuration.

2. The method of claim 1, wherein:

the step of performing the plastic analysis comprises:

determining a flow structure of the flowpath defined by the platform surface of the unmodified blade configuration, while the unmodified blade configuration is subjected to the one or more maximum engine operating conditions, and obtaining temperature data across an area of the platform surface, while the unmodified blade configuration is subjected to the maximum engine operating conditions, and the method further comprises identifying stresses and residual plastic deformation across the area of the platform surface to obtain identified critical areas, while the unmodified blade configuration is subjected to the one or more maximum engine operating conditions.

3. The method of claim 2, further comprising the step of adding material to the blade to place the residual plastic deformation within the predetermined acceptable range, if a determination is made that the residual plastic deformation of the platform surface is not within the predetermined acceptable range, after the step of identifying.

4. The method of claim 2, wherein the step of determining a flow structure of the flowpath defined by the platform surface of the unmodified blade configuration comprises performing a computation fluid dynamics analysis on the unmodified blade configuration, while the unmodified blade configuration is subjected to the one or more maximum engine operating conditions.

5. The method of claim 2, wherein the step of obtaining temperature data comprises performing a thermal analysis on the blade and on the area of the platform surface, while the unmodified blade configuration is subjected to the one or more maximum engine operating conditions.

6. The method of claim 2, wherein the step of identifying stresses and residual plastic deformation is based, in part, on a temperature of a predetermined location on the blade and a material strength of the blade.

7. The method of claim 1, wherein the step of determining the inverse of the residual plastic deformation of the platform surface includes determining that the inverse of the residual plastic deformation of the platform surface comprises a depression.

8. A method of forming a turbine rotor for use in an engine, the method comprising the steps of:
providing an unmodified blade configuration including a platform and an airfoil extending from the platform, the platform including a surface defining a portion of a flowpath of the engine;
subjecting the unmodified blade configuration to one or more maximum engine operating conditions, wherein the one or more maximum engine operating conditions include rotating a turbine rotor including the unmodified blade configuration thereon at a predetermined maximum speed and exposing the turbine rotor to a predetermined maximum temperature;
performing a plastic analysis of the unmodified blade configuration, while the unmodified blade configuration is subjected to the one or more maximum engine operating conditions;
calculating a residual plastic deformation of the platform surface, based on the plastic analysis;
determining whether the residual plastic deformation of the platform surface is within a predetermined acceptable range;
determining an inverse of the residual plastic deformation of the platform surface, if a determination is made that the residual plastic deformation of the platform surface is within the predetermined acceptable range;
incorporating the inverse of the residual plastic deformation of the platform surface into the unmodified blade configuration to form the modified blade configuration;
casting a turbine blade from a mold including the modified blade configuration;
attaching the turbine blade to a hub to form the turbine rotor; and
rotating the turbine rotor at the maximum engine operating conditions to impart a final contour to the turbine blade.

9. The method of claim 8, wherein:
the step of performing the plastic analysis comprises:
determining a flow structure of the flowpath defined by the platform surface of the unmodified blade configuration, while the unmodified blade configuration is subjected to the one or more maximum engine operating conditions, and
obtaining temperature data across an area of the platform surface, while the unmodified blade configuration is subjected to the maximum engine operating conditions, and
the method further comprises identifying stresses and residual plastic deformation across the area of the platform surface to obtain identified critical areas, while the unmodified blade configuration is subjected to the one or more maximum engine operating conditions.

10. The method of claim 9, further comprising the step of adding material to the blade to place the residual plastic deformation within the predetermined acceptable range, if a determination is made that the residual plastic deformation of the platform surface is not within the predetermined acceptable range, after the step of identifying.

11. The method of claim 9, wherein the step of determining a flow structure of the flowpath defined by the platform surface of the unmodified blade configuration comprises performing a computation fluid dynamics analysis on the unmodified blade configuration, while the unmodified blade configuration is subjected to the one or more maximum engine operating conditions.

12. The method of claim 9, wherein the step of obtaining temperature data comprises performing a thermal analysis on the blade and on the area of the platform surface, while the unmodified blade configuration is subjected to the one or more maximum engine operating conditions.

13. The method of claim 9, wherein the step of identifying stresses and residual plastic deformation is based, in part, on a temperature of a predetermined location on the blade and a material strength of the blade.

14. The method of claim 8, wherein the step of determining the inverse of the residual plastic deformation of the platform surface includes determining that the inverse of the residual plastic deformation of the platform surface comprises a depression.

* * * * *